US012781466B2

(12) United States Patent
Sawada

(10) Patent No.: US 12,781,466 B2
(45) Date of Patent: Nov. 3, 2026

(54) METHOD OF ADJUSTING RELIEF PRESSURE OF RELIEF VALVE FOR SWING MOTOR

(71) Applicant: Caterpillar SARL, Geneva (CH)

(72) Inventor: Naoki Sawada, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 19/149,607

(22) PCT Filed: Jan. 26, 2024

(86) PCT No.: PCT/EP2024/025049
§ 371 (c)(1),
(2) Date: Jul. 21, 2025

(87) PCT Pub. No.: WO2024/156477
PCT Pub. Date: Aug. 2, 2024

(65) Prior Publication Data
US 2026/0234899 A1 Aug. 13, 2026

(30) Foreign Application Priority Data
Jan. 27, 2023 (JP) ................................ 2023-010601

(51) Int. Cl.
*E02F 9/12* (2006.01)
*F15B 19/00* (2006.01)
(Continued)

(52) U.S. Cl.
CPC ............ *E02F 9/123* (2013.01); *F15B 19/002* (2013.01); *E02F 9/128* (2013.01); *E02F 9/2203* (2013.01);
(Continued)

(58) Field of Classification Search
CPC .... F15B 11/16; F15B 19/002; F15B 2211/55; F15B 2211/7058; E02F 9/123; E02F 9/128; E02F 9/2203; E02F 9/226
See application file for complete search history.

(56) References Cited

U.S. PATENT DOCUMENTS 5,005,358 A * 4/1991 Hirata ................ F15B 13/0417 60/426
5,063,742 A * 11/1991 Yoshimatsu ........ F15B 11/0445 60/494
(Continued)

FOREIGN PATENT DOCUMENTS

CN 103732927 A 4/2014
JP H01255702 A 10/1989
(Continued)

OTHER PUBLICATIONS

Patent Cooperation Treaty, International Search Report and Written Opinion of the International Searching Authority for International Application No. PCT/EP2024/025049 dated May 23, 2024, 7 pages.

*Primary Examiner* — Michael Leslie

(57) ABSTRACT

A method is provided for adjusting the relief pressure of a relief valve for a swing motor that can set the relief pressure of each relief valve with high accuracy without rotating the upper swing body. Sequentially switching the relief valve for the swing motor to be adjusted; and at a state that the rotation of each swing motor is forcibly stopped and the relief pressure of the relief valve for a swing motor to be adjusted is less than the relief pressure of the relief valve for the other swing motor, performing a process of adjusting the relief pressure of the relief valve for the swing motor to be adjusted while supplying the working oil from the pump at a flow rate less than the maximum flow rate of the swing motor.

6 Claims, 3 Drawing Sheets

(51) Int. Cl.
*E02F 9/22* (2006.01)
*F15B 11/16* (2006.01)

(52) U.S. Cl.
CPC ........... *F15B 11/16* (2013.01); *F15B 2211/55* (2013.01); *F15B 2211/6309* (2013.01); *F15B 2211/7058* (2013.01); *F15B 2211/71* (2013.01)

(56) References Cited

U.S. PATENT DOCUMENTS

| | | | | |
|---|---|---|---|---|
| 6,339,929 | B1 * | 1/2002 | Udagawa | E02F 9/123 60/468 |
| 9,133,602 | B2 * | 9/2015 | Ooki | E02F 9/2095 |
| 9,249,879 | B2 * | 2/2016 | Ishikawa | F16H 61/4061 |
| 2012/0131913 | A1 | 5/2012 | Yoshino et al. | |
| 2017/0016208 | A1 | 1/2017 | Saitoh et al. | |

FOREIGN PATENT DOCUMENTS

| | | | |
|---|---|---|---|
| JP | H02-101848 | U | 8/1990 |
| JP | H05-60105 | A | 3/1993 |
| JP | H10-109889 | A | 4/1998 |
| JP | H11-94105 | A | 4/1999 |
| JP | 2002-147401 | A | 5/2002 |
| JP | 2010270450 | A | 12/2010 |
| JP | 6662656 | B2 | 3/2020 |
| WO | 2016035902 | A1 | 3/2016 |

* cited by examiner

METHOD OF ADJUSTING RELIEF PRESSURE OF RELIEF VALVE FOR SWING MOTOR

CROSS-REFERENCE TO RELATED APPLICATIONS

This Application is a U.S. national phase application filed under 35 U.S.C. § 371 of International Application Number PCT/EP2024/025049, filed Jan. 26, 2024, designating the United States, which claims priority to Japanese Patent Application JP 2023-010601, filed Jan. 27, 2023.

TECHNICAL FIELD

The present invention relates to a method of adjusting relief pressure of a relief valve for a plurality of swing motors that swivel a swing body of a working machine.

BACKGROUND

In hydraulically driven working machines, the various relief valves provided in the hydraulic circuit can obtain the desired performance in each part driven by the appropriate setting of the relief pressure (see, e.g., Patent Documents 1 and 2).

PRIOR ART DOCUMENTS

Patent Documents

Patent Document 1: JP 1999-94105A
Patent Document 2: JP 1993-60105A

SUMMARY OF THE INVENTION

Problems to be Solved by the Invention

For example, a relief valve is also set in the hydraulic motor, which is a fluid pressure actuator (fluid pressure motor) for rotating the upper swing body of the working machine, and the relief pressure is directly connected to the performance of the swivel torque. For example, when the relief pressure is set at a low level, it is easier to be unable to swivel in the inclined direction due to insufficient acceleration torque on the slope, or to increase the flow of swivel due to insufficient brake torque.

In particular, in the case of large working machines, two swing motor units may be provided. Each of these units is provided with a relief valve, and there will be two relief valves on the same system. Then, by equidistribution of the hydraulic oil supplied from the pump to each unit, each relief valve is operated at a flow rate of ½ of the pump flow rate, which is the sum of the maximum flow rate of the swing motor. Therefore, it is desirable that the relief pressure be set under this flow condition.

However, in the case of the swing motor unit, when the hydraulic oil is flowed and driven like other pumps and motors at the time of adjusting the pressure of the relief valve, the upper swing body will rotate, so a large amount of space is required, especially for large working machines, which is not practical. Therefore, when actually adjusting the pressure of the relief valve, the swing motor unit is forced to stop so that the upper swing body does not swivel. In that case, it is easy for the flow rate on either side of the relief valve to be too large or too small without equal distribution of the pump flow rate due to a balance such as piping pressure drop, making it difficult to adjust the pressure with high accuracy.

In addition, when adding circuits for pressure adjustment, additional piping is required, which makes it more complicated, increases the number of parts, and increases the risk of oil leakage.

In view of this, it is an object of the present invention to provide a method for adjusting the relief pressure of a relief valve for a swing motor that can set the relief pressure of each relief valve with high accuracy without swiveling the swing body.

Means for Solving the Problem

The invention according to claim 1 is a method for adjust relief pressure of a relief valve for a swing motor of a working machine, wherein the step of adjusting the relief pressure of the relief valve for the swing motor to be adjusted is performed by sequentially switching the relief valve for the swing motor to be adjusted meanwhile supplying the working fluid from the pump with a flow rate less than or equal to the maximum flow rate of the swing motor under a state that the rotation of each swing motor is forced to stop and the relief pressure of the relief valve for the swing motor to be adjusted is lower than the relief pressure of the relief valve for the other swing motor.

According to the invention of claim 2, in the method for adjusting relief pressure of a relief valve for a swing motor according to claim 1, the relief pressure of the relief valve for one swing motor is set higher than the relief pressure of the relief valve for the other swing motor while the swing motor is set in pairs and the rotation of each swing motor is forced to be stopped, the relief pressure of the relief valve for the other swing motor is adjust while supplying working fluid from the pump at a flow rate below the maximum flow rate of the swing motor, the relief pressure of the relief valve for one swing motor is set to be lower than the relief pressure of the relief valve for the other swing motor adjusted in the first step, and the relief pressure of the relief valve for one swing motor is adjusted while supplying the working fluid from the pump at a flow rate below the maximum flow rate of the swing motor.

According to the invention of claim 3, in the method for adjusting the relief pressure of a relief valve for a swing motor according to claim 2, a path for one swing motor to supply a working fluid from a pump is shorter than that of the other swing motor.

According to the invention of claim 4, the flow rate of the working fluid supplied when adjusting the relief pressure in the method for adjusting the relief pressure of a relief valve for a swing motor according to any one of claims 1 to 3 is a maximum flow rate of the swing motor, respectively.

Effect of the Invention

According to the invention of claim 1, the pressure relief for a plurality of swing motors is set in a priority order, and the total flow rate is concentrated on the pressure relief valve for the swing motor to be adjusted, so that the pressure relief of each pressure relief valve can be set with high accuracy without rotating the swing body.

According to the invention of claim 2, the setting of the relief pressure is prioritized to concentrate the total flow rate to one of them by means of the relief valve for one swing motor and the relief valve for the other swing motor, such that the relief pressure of each of the relief valves can be set with high accuracy without rotating the swing body.

According to the invention of claim 3, it is possible to adjust the pressure in a state where the pressure loss of the supply line of the working fluid is as small as possible, and the relief pressure can be set with higher accuracy.

According to the invention of claim 4, the relief pressure can be set at the maximum state of the flow rate supplied to one swing motor or the other swing motor when the swing body is actually swivel, so that when the swing body is actually swivel, the swivel torque as intended can be obtained.

DETAILED DESCRIPTION

Embodiments of the present invention will be described below with reference to the drawings.

Figure 1:
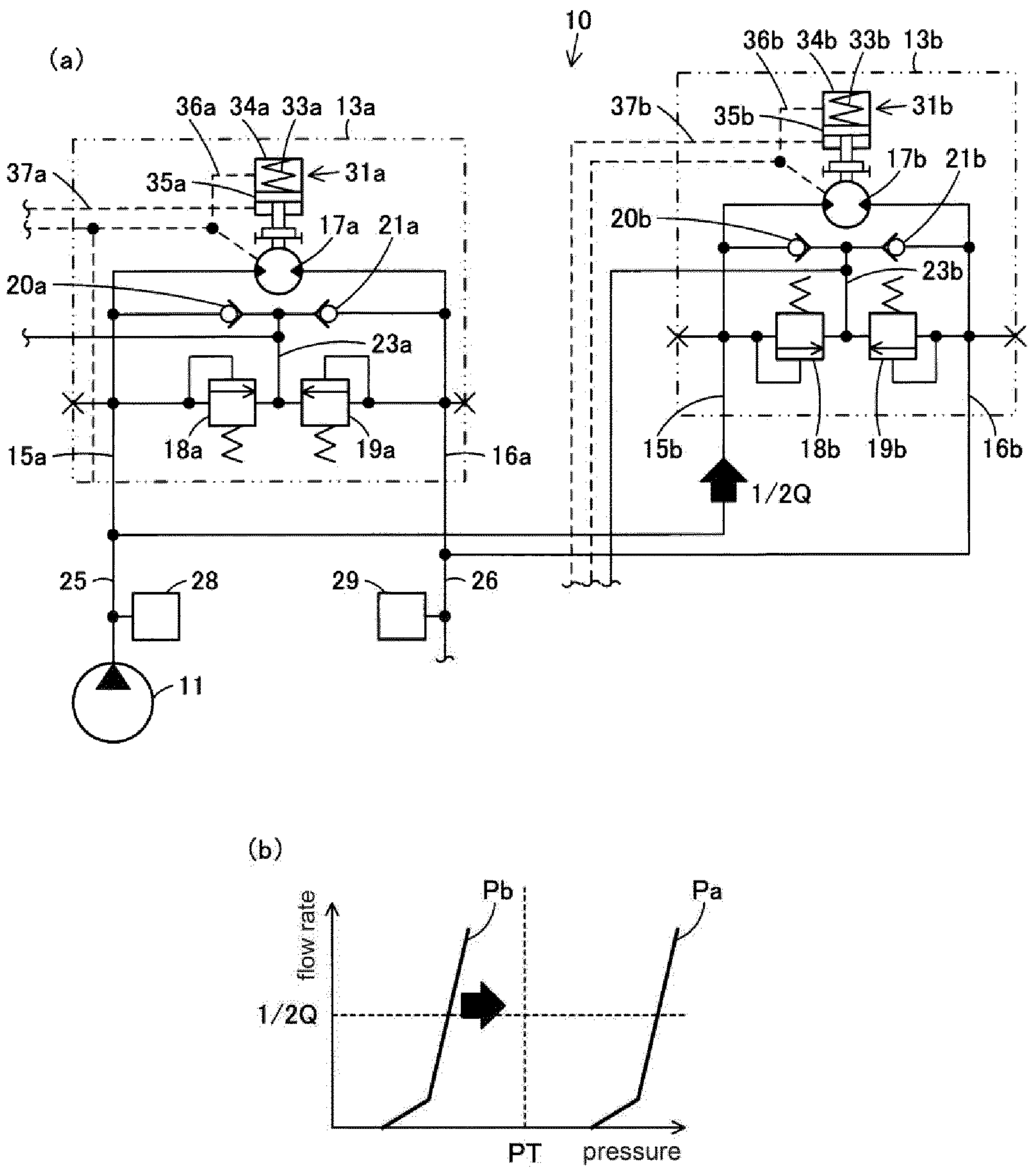
FIG. 1 illustrates an embodiment of a method for adjusting relief pressure of a relief valve for a swing motor according to the present invention, wherein (a) is a fluid pressure circuit diagram showing a first step, and (b) is a graph showing relief pressure settings of the relief valve in the first step.
Figure 4:
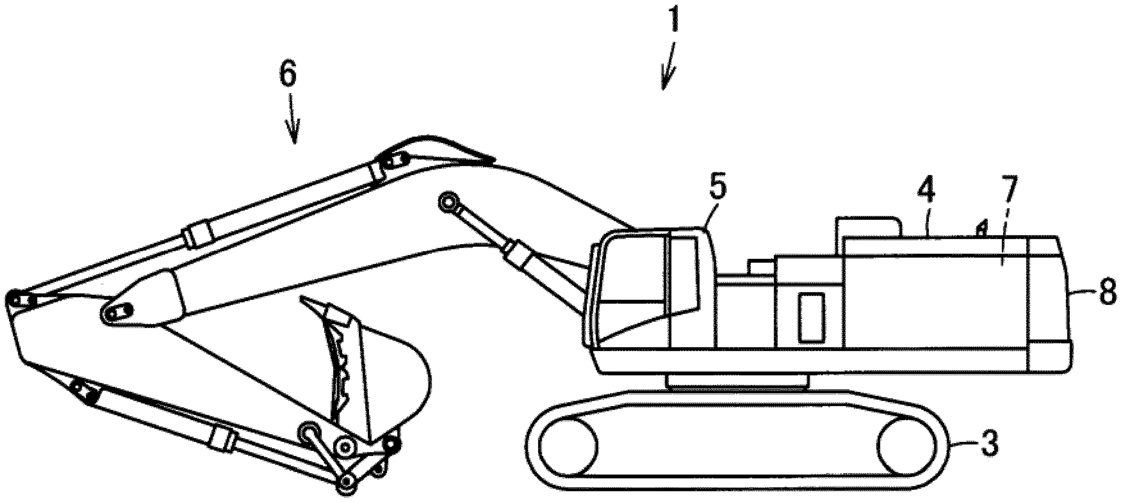
FIG. 4 is a side view illustrating a working machine comprising the above fluid pressure circuit.

In FIGS. 4, 1 represents a working machine. In the present embodiment the working machine 1 is a machine driven by hydraulic pressure which is actuated by working hydraulic pressure as a working fluid pressure, and in the illustrated example, for example, is a hydraulic excavator type working machine. The working machine 1 of the present embodiment is, for example, a large working machine of 49 tons or more.

The working machine 1 is a swivel-type working machine including a lower traveling body 3 and an upper swing body 4 which is a swing body that is rotatably provided in the lower traveling body 3. The upper swing body 4 is equipped with a cab 5, which is a driving cab, and a working device 6. The work device 6 is axially connected to the upper swing body 4 on a side of the cab 5. In addition, the upper swing body 4 is provided with a machine room 7 containing an engine, a pump, a control valve, etc., and various tanks such as a hydraulic oil tank and a fuel tank are provided on a side opposite to the cab 5 with the working device 6 between them, and a counter weight 8 is mounted at the end opposite to the working device 6 with respect to the machine room 7 and the various tanks.

The hydraulic circuit 10, which is a fluid pressure circuit used in the working machine 1, as shown in FIG. 1(*a*), supplies the hydraulic oil sucked up and discharged from the hydraulic oil tank by the pump (main pump) 11 driven by the engine to a hydraulic actuator, which is a fluid pressure actuator, and controls the flow rate and direction of the supplied hydraulic oil by a control valve operated in response to the operation of an operator such as a lever or a pedal mounted on the cab 5 shown in FIG. 4, so that it is possible to perform various kinds of work by the work device 6, such as front and rear of the driving by the lower traveling body 3, stopping the swiveling and swiveling of the lower traveling body 3 on the upper swing body 4.

Returning to FIG. 1(*a*), the pump 11 is connected to a plurality of, for example, paired, swing motor units 13*a*, 13*b* via a control valve. The swing motor unit 13*a* is connected between the output passages 15*a*, 16*a* in which hydraulic oil is supplied from the pump 11, one swing motor 17*a*, the relief valves 18*a*, 19*a* paired in opposite directions to each other, and the check valves 20*a*, 21*a* for make-up paired in opposite directions to each other, and the make-up passages 23*a* are connected between the relief valves 18*a*, 19*a* and between the check valves 20*a*, 21*a*. Likewise, the swing motor unit 13*b* is connected between the output passages 15*b*, 16*b* in which the hydraulic oil is supplied from the pump 11, one swing motor 17*b*, the relief valves 18*b*, 19*b* paired in opposite directions to each other, and the check valves 20*b*, 21*b* for make-up paired in opposite directions to each other, and the make-up passages 23*b* are connected between the relief valves 18*b*, 19*b* and between the check valves 20*b*, 21*b*. The make-up passages 23*a*, 23*b* are connected to the tank, for example, via an oil cooler or a check valve with a spring.

The output passages 15*a*, 15*b* and the output passages 16*a*, 16*b* are switched so that, via the control valve, one is connected to the passage 25 and the other to the passage 26. The output passage 15*b* is branched from the output passage 15*a* and is longer than the output passage 15*a*. The output passage 16*b* is also branched from the output passage 16*a* and is longer than the output passage 16*a*. Therefore, the swing motor 17*a* is closer to the pump 11 than the swing motor 17*b*, and the supply line of the hydraulic oil from the pump 11 is shorter. In addition, before the hydraulic oil branches to the swing motor 17*b*, a large flow rate (the flow rate of the two swing motors 17*a*, 17*b*) flows into the output passages 15*a*, 16*a*, so from the viewpoint of pressure loss, the hydraulic piping diameter of the output passages 15*a*, 16*a* is generally designed to be larger than the output passages 15*b*, 16*b*.

The passages 25, 26 are passages for supplying hydraulic oil from the pump 11 on one side and returning to the tank on the other side by switching the control valve. The passages 25, 26 are provided with pressure sensors 28, 29. In the present embodiment, the pump pressure is basically detected by the pressure sensor 28 and is not a mandatory configuration for the pressure sensor 29.

The swing motors 17*a*, 17*b* are hydraulic motors as fluid pressure motors that enable the upper swing body 4 (FIG. 4) to swivel left and right relative to the lower traveling body 3 (FIG. 4). The swing motors 17*a*, 17*b* are arranged opposite to each other, for example, with respect to the center of rotation of the upper swing body 4 (FIG. 4). The swing motors 17*a*, 17*b* are provided with braking means 31*a*, 31*b* for braking the rotation of the swing motors 17*a*, 17*b*. The braking means 31*a*, 31*b* are also referred to as a parking brake mechanism or the like. By stopping the rotation of the swing motors 17*a*, 17*b*, the braking means 31*a*, 31*b* hold the upper swing body 4 (FIG. 4) in a forced swivel stop state with respect to the lower traveling body 3 (FIG. 4), for example, when the operation of the working machine 1 (FIG. 4) is stopped. In the present embodiment, the brake means 31*a* and 31*b* are exemplified by a mechanical brake for mechanically braking the rotation of the swing motors 17*a* and 17*b*. For example, each of the braking means 31*a*, 31*b* comprise a cylinder 34*a*, 34*b* having a brake loading spring 33*a*, 33*b* therein, and a piston 35*a*, 35*b* that transmits the brake load of the springs 33*a*, 33*b* to the swing motor shaft, wherein the spring chambers of the cylinders 34*a*, 34*b* are communicated to the tank by the drain passages 36*a*, 36*b*, and the piston chambers of the cylinders 34*a*, 34*b* are communicable to a common pilot pump via the brake release introductory passages 37*a*, 37*b* and the brake release solenoid valve.

The relief valves 18*a*, 19*a* and 18*b*, 19*b* then set the upper limit of the supply pressure from the pump 11 to their relief pressure by opening and flowing the hydraulic oil from the make-up passages 23*a*, 23*b* to the tank to relieve the pressure when the pressure above the set relief pressure is applied. Thus, depending on the relief pressure of the relief valves 18*a*, 19*a* and 18*b*, 19*b*, the swivel torque of the swing motors 17*a*, 17*b*, i.e. the upper swing body 4 (FIG. 4), is set. The relief valves 18*a*, 19*a* and 18*b*, 19*b* are variable relief valves, for example, electromagnetic variable relief valves in which the relief pressure is set according to the current value.

The check valves 20*a*, 21*a* and 20*b*, 21*b* open in response to a pressure difference between the output passages 15*a*, 16*a* and 15*b*, 16*b* and the make-up passages 23*a*, 23*b*, and replenish the hydraulic oil from the tank to the output passages 15*a*, 16*a* or the output passages 15*b*, 16*b* (on the swing motor 17*a*, 17*b* side) via the make-up passages 23*a*, 23*b* to prevent the occurrence of a vacuum due to inertial rotation of the upper swing body 4 (FIG. 4) when the rotation of the swive motors 17*a*, 17*b* is stopped.

Figure 2:
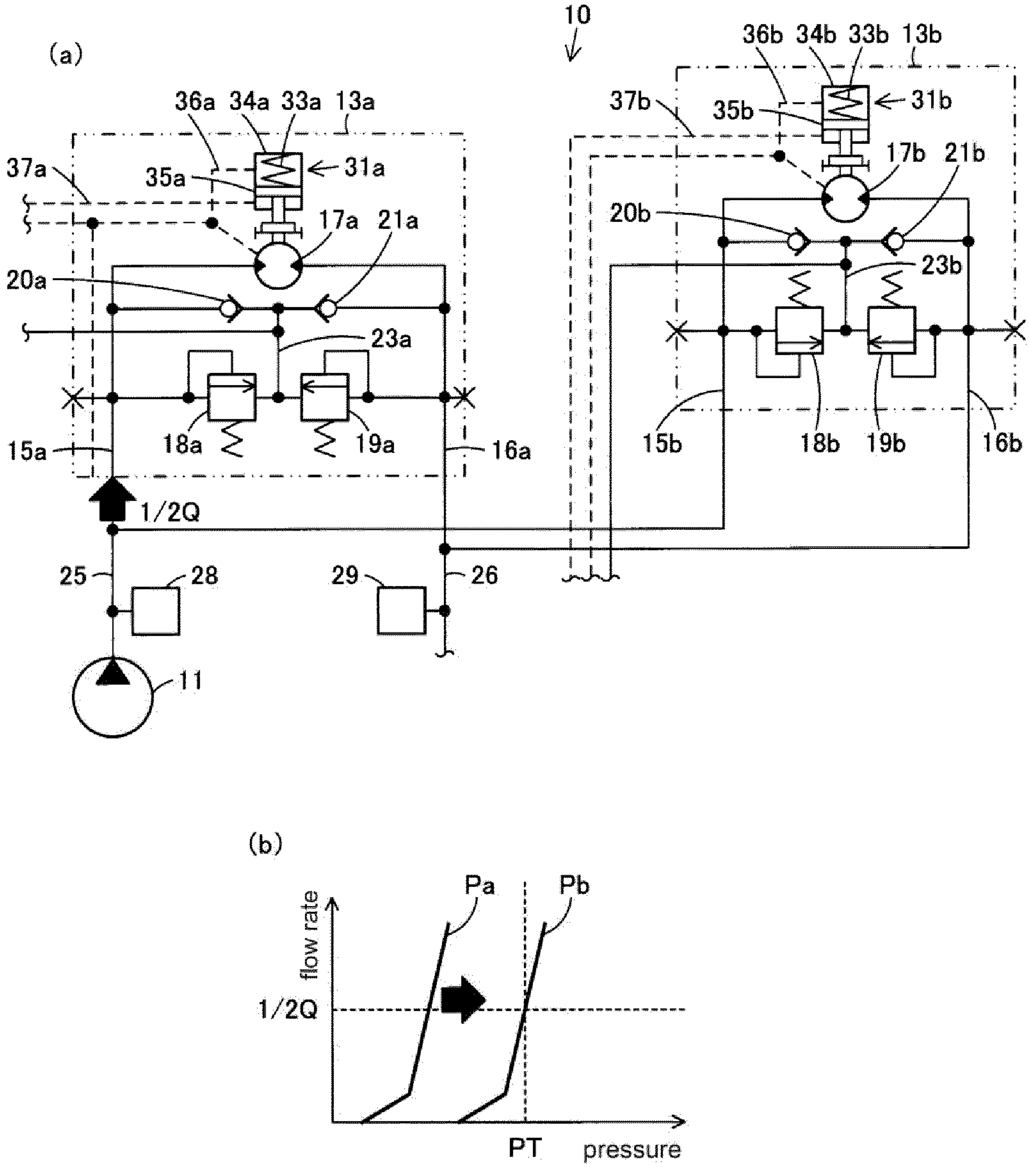
FIG. 2(*a*) is a fluid pressure circuit diagram showing a second step, and (*b*) is a graph showing the relief pressure setting of the relief valve in the second step.
Figure 3:
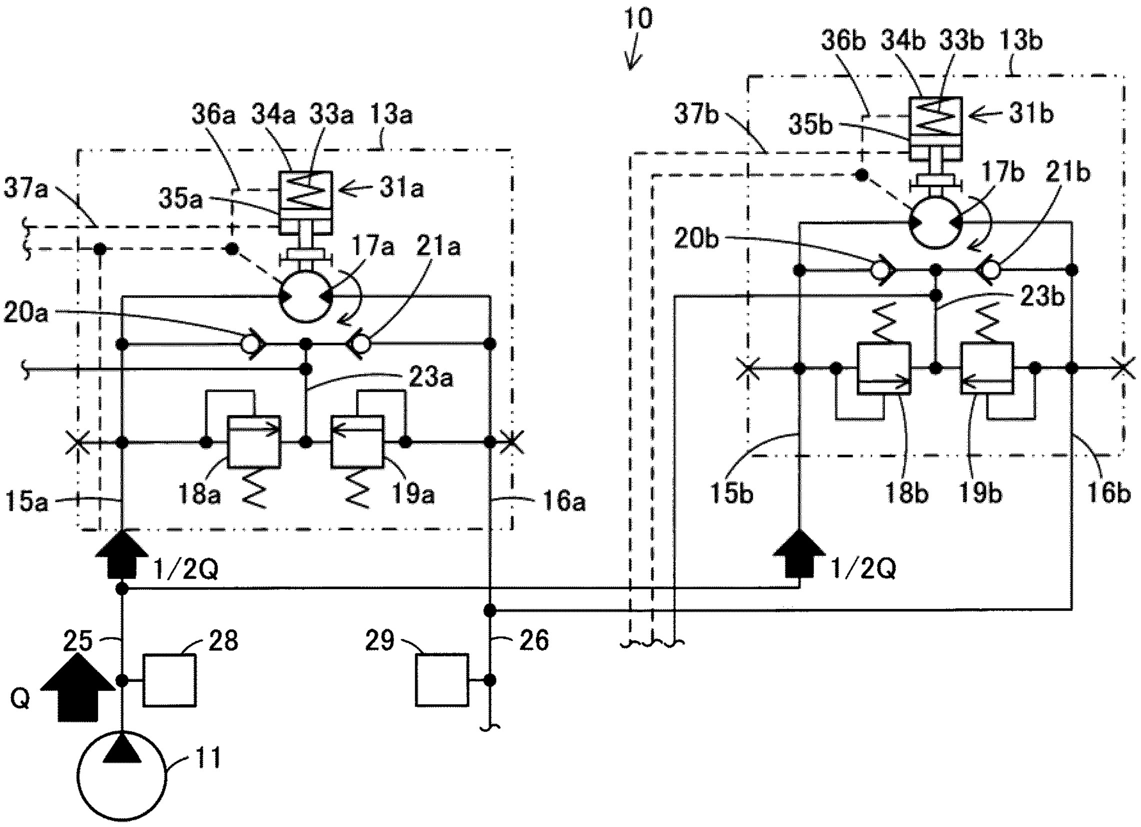
FIG. 3 is a fluid pressure circuit diagram illustrating an operating state under relief pressure set by a method for adjusting relief pressure of a relief valve for the above swing motor.

In FIGS. 1 to 3, hydraulic circuits connecting hydraulic actuators such as hydraulic cylinders and hydraulic motors other than the swing motor 15 and the pump 11 are omitted.

Next, a method for adjusting the relief pressure of the relief valve according to the illustrated embodiment will be described.

As shown in FIG. 3, during the actual rotation of the upper swing body 4 (FIG. 4), the hydraulic oil discharged from the pump 11 is equally distributed to the two swing motors 17*a*, 17*b*, which are balanced by the swing motors 17*a*, 17*b* rotating at the same rotational speed.

In this way, in order for the hydraulic oil discharged from the pump 11 to be equally distributed to the two swing motors 17*a*, 17*b*, the relief pressure of the relief valves 18*a*, 19*a* for the swing motor 17*a* and the relief pressure of the relief valves 18*b*, 19*b* for the swing motor 17*b* must be set to the same or substantially the same target pressure set in advance. If these relief pressure is different, the flow balance will be unbalanced because the hydraulic oil discharged from the pump 11 will flow more to the swing motor where the relative pressure is lower.

However, when trying to set the relief pressure of the relief valves 18*a*, 19*a* and the relief pressure of the relief valves 18*b*, 19*b* for the swing motor 17*b* while actually flowing and driving the hydraulic oil to the swing motors 17*a*, 17*b*, it is desirable to set the relief pressure with the swing motors 17*a*, 17*b* forced to stop by the braking means 31*a*, 31*b*, since the rotation of the swing motors 17*a*, 17*b* causes the upper swing body 4 (FIG. 4) to swivel, especially in the case of the large working machine 1 (FIG. 4), which requires a large amount of space.

However, in the state where the swing motors 17*a*, 17*b* are forced to stop, when the hydraulic oil is delivered simultaneously from the pump 11 to the swing motors 17*a*, 17*b*, due to the influence of the piping pressure loss, that is, the length of the supply line of the hydraulic oil from the pump 11, the flow rate of the hydraulic oil is biased between the swing motor 17*a* side and the swing motor 17*b* side, and thus it is difficult to set the relief pressure with high accuracy.

Therefore, in the present embodiment, the flow rate of the hydraulic oil from the pump 11 is throttled to less than or equal to the maximum flow rate of the swing motors 17*a*, 17*b*, and the relief pressure can be set with high accuracy by prioritizing the setting of the relief pressure and concentrating the entire flow rate on one side by means of the relief valves 18*a*, 19*a* and 18*b*, 19*b*.

In other words, the step of forcibly stopping the rotation of each swing motor and adjusting the relief pressure of the relief valve for the swing motor to be adjusted is performed by sequentially switching the relief valve for the swing motor to be adjusted while supplying hydraulic oil from the pump 11 at a flow rate lower than the maximum flow rate of the swing motor at a state where the relief pressure for the swing motor to be adjusted is lower than the relief pressure for the other swing motors, preferably lower than the target pressure.

Specifically, in the present embodiment having a pair of swing motors 17*a*, 17*b*, first, in a state where the rotation of the swing motors 17*a*, 17*b* is forcibly stopped by the braking means 31*a*, 31*b*, as a first step, the relief pressure of the relief valve for one swing motor is set to a higher pressure than the relief pressure of the relief valve for the other swing motor, and the relief pressure of the relief valve for the other swing motor is adjusted while squeezing the flow rate below the maximum flow rate of the swing motor and supplying hydraulic oil from the pump 11.

In this case, it is preferable that one swing motor is on the side where the supply line of the hydraulic oil from the pump 11 is short, as the swing motor 17*a* in the present embodiment, and the other swing motor is on the side where the supply line of the hydraulic oil from the pump 11 is long, being the swing motor 17*b* in the present embodiment.

That is, as a first step, as shown in FIGS. 1(*a*) and 1(*b*), the relief pressure Pa of the relief valves 18*a*, 19*a* for the swing motor 17*a* with a short supply line of hydraulic oil from the pump 11 is set and fixed at a higher pressure than the relief pressure Pb of the relief valves 18*b*, 19*b* for the swing motor 17*b* with a long supply line of hydraulic oil from the pump 11, and the relief pressure Pb of the relief valves 18*b*, 19*b* of the swing motor 17*b* is adjusted to the target pressure PT while squeezing the flow rate from the pump 11 to less than half of the sum Q of the maximum flow rates of the swing motors 17*a*, 17*b* to supply the hydraulic oil. In this way, since the relief pressure Pb of the relief valves 18*b*, 19*b* for the swing motor 17*b* is lower than the relief pressure Pa of the relief valves 18*a*, 19*a* for the swing motor 17*a*, the hydraulic oil discharged from the pump 11 flows substantially the entire flow rate to the swing motor 17*b* side.

At this time, the flow rate of the pump 11 is assumed to be a flow rate that flows to the swing motor 17*b* during actual rotation, that is, a flow rate of ½Q or less, which is the maximum flow rate of the swing motor 17 *b*.

However, it is possible to accurately set the relief pressure of the relief valves 18*b*, 19*b* to the target pressure during actual rotation by considering the increase in the relief pressure due to the increase in the relief volume or flow rate, that is, the influence of the override characteristic, preferably ½Q. When squeezing the flow rate of the hydraulic oil from the pump 11, it is preferable that the control valve is basically fully open and the discharge flow rate of the pump 11 itself is squeezed so as not to affect the pressure loss caused by the control valve as much as possible in the setting of the relief pressure.

In this embodiment, the relief pressure is adjusted while the pump pressure is monitored by the pressure sensor 28.

That is, the relief pressure of the relief valve 18*b* is set depending on whether the pump pressure detected by the pressure sensor 28 is the target pressure. The relief pressure of the relief valve 19*b* is also set according to whether the pump pressure detected by the pressure sensor 28 is the target pressure.

It should be noted that when the relief pressure of the relief valve 18*b* is set and when the relief pressure of the relief valve 19*b* is set, the supply direction of the hydraulic oil from the pump 11 is reversed by the control valve.

Then, as a second step, the relief pressure of the relief valve for one swing motor is set to be lower than the relief pressure of the relief valve for the other swing motor adjusted in the first step, and the relief pressure of the relief valve for one swing motor is adjusted while squeezing the flow rate and discharging the hydraulic oil than the sum of the maximum flow rates of the swing motor paired from the pump 11.

As described above, in the present embodiment, one swing motor is the swing motor 17*a* and the other swing motor is the swing motor 17*b*. In the second step, as shown in FIGS. 2(*a*) and 2(*b*), the relief pressure Pa of the relief valves 18*a*, 19*a* for the swing motor 17*a* is set to a lower pressure than the relief pressure Pb of the relief valves 18*b*, 19*b* for the swing motor 17*b* adjusted in the first step, and the relief pressure Pa of the relief valves 18*a*, 19*a* for the swing motor 17*a* is adjusted to the target pressure PT while squeezing the flow rate from the pump 11 to less than half the sum of the maximum flow rate Q of the swing motors 17*a*, 17*b* and discharging the hydraulic oil. In this way, since the relief pressure Pa of the relief valves 18*a*, 19*a* for the swing motor 17*a* is lower than the relief pressure Pb of the relief valves 18*b*, 19*b* for the swing motor 17*b*, the hydraulic oil discharged from the pump 11 flows substantially the entire flow rate to the swing motor 17*a* side.

At this time, the flow rate of the pump 11 may be the same as or different from the first step if it is the flow rate flowing to the swing motor 17*a* during actual rotation, that is, a flow rate of ½Q or less, which is the maximum flow rate of the swing motor 17*a*. Preferably, as in the first step, it is possible to accurately set the relief pressure of the relief valves 18*a* and 19*a* to the target pressure during actual rotation by considering the override characteristics of the relief valve to ½Q. When squeezing the flow rate of the hydraulic oil from the pump 11, it is preferable that the control valve is basically fully open and the discharge flow rate of the pump 11 itself is squeezed so as not to affect the pressure loss caused by the control valve as much as possible in the setting of the relief pressure.

In this embodiment, the relief pressure is adjusted while the pump pressure is monitored by the pressure sensors 28, 29. In other words, the relief pressure of the relief valve 18*a* is set according to whether the pump pressure detected by the pressure sensor 28 is the target pressure. In addition, the relief pressure of the relief valve 19*a* is set according to whether the pump pressure detected by the pressure sensor 28 is the target pressure.

Note that when the relief pressure of the relief valve 18*a* is set and when the relief pressure of the relief valve 19*a* is set, the supply direction of the hydraulic oil from the pump 11 is reversed by the control valve.

In this way, the relief pressure of the relief valves for the plurality of swing motors is set to the priority order, and the total flow rate is concentrated on the relief valve for the swing motor to be adjusted, so that the relief pressure of each relief valve can be set with high accuracy without rotating the upper swing body 4.

In the present embodiment, the relief pressure of the relief valves 18*a* and 19*a* for the swing motor 17*a* and the relief valves 18*b* and 19*b* for the swing motor 17*b* is set to a priority order, and the entire flow rate is concentrated on one of the relief valves 18*a*, 19*a*, and relief valve 18*b*, 19*b*, such that the relief pressure of the relief valves 18*a*, 19*a* and the relief valves 18*b*, 19*b* can set with high accuracy, without rotating the upper swing body 4.

In addition, if, for example, the relief pressure of the relief valves 18*a*, 19*a* of the swing motor 17*a* on the side close to the pump 11, that is, the supply line of the hydraulic oil is short, is set first, and then the relief pressure of the relief valves 18*b*, 19*b* of the swing motor 17*b* on the side far from the pump 11, that is, the supply line of the hydraulic oil is long, is set. In this case, when setting the relief pressure of the relief valve 18*b*, 19*b*, in accordance with the increase of the pump pressure, the influence of the pressure loss of the supply line of the hydraulic oil to the swing motor 17*b* side makes it easier for the hydraulic oil from the pump 11 to flow to the relief valves 18*a* and 19*a* side where the relief pressure was previously set, and to flow all the hydraulic oil to the relief valves 18*b* and 19*b* side during pressure adjustment. In addition, the relief pressure of the relief valves 18*b*, 19*b* on the swing motor 17*b* side, which is a side where the pressure loss is likely to be greater due to the smaller hydraulic piping diameter of the supply line compared to the swing motor 17*a* side and the position farther from the pump 11, may not be detected even when the relief pressure of the relief valves 18*b*, 19*b* on the swing motor 17*b* side is significantly lower. With regard to this, in this embodiment, the relief pressure of the relief valves 18*b*, 19*b* of the swing motor 17*b* whose pressure loss is relatively large farther away from the pump 11 is set first, and then the relief pressure of the relief valves 18*a*, 19*a* of the swing motor 17*a* whose pressure loss is relatively small closer to the pump 11 is set. As a result, when the relief pressure of the relief valves 18*a* and 19*a* for the swing motor 17*a* is set, the pressure loss of the supply line of the hydraulic oil is less influenced by the pressure of the hydraulic fluid, and the total amount of the hydraulic oil from the pump 11 can be supplied to the relief valves 18*a* and 19*a* side before the end of the pressure adjustment, so that the change in the pump pressure can be regarded as a change in relief pressure of the relief valves 18*a* and 19A. Accordingly, by adjusting the pressure in the order of the present embodiment, the pressure can be controlled in the state where the pressure loss of the supply line of the hydraulic oil is as small as possible, and the relief pressure can be set to a higher accuracy.

Furthermore, by setting the flow rate of the hydraulic oil supplied in the first and second steps to ½Q, which is the maximum flow rate of each swing motor 17*a*, 17*b*, the relief pressure can be set at the maximum state of the flow rate supplied to the swing motor 17*a* or the swing motor 17*b* during the actual swivel of the upper swing body 4. Therefore, when the upper swing body 4 is actually swiveling, it is possible to obtain the swivel torque as intended.

As a result, sufficient acceleration torque and brake torque of the upper swing body 4 can be ensured, and the upper swing body 4 can be reliably swiveled in the inclined direction at the slope, and the swivel flow of the upper swing body 4, that is, the inertial rotation at the time of stopping, can be reduced.

INDUSTRIAL APPLICABILITY

The present invention may be utilized in the industry for manufacturers engaged in manufacturing and sales industries of working machines having a swinging body and the like.

The invention claimed is:

1. A method for adjusting relief pressure of a relief valve for a plurality of swing motors to swivel a swing body of a working machine, comprising:

sequentially switching the relief valve for the swing motor to be adjusted; and performing a process of forcibly stopping a rotation of each swing motor, and adjusting the relief pressure of the relief valve for the swing motor to be adjusted while supplying working fluid from a pump at a flow rate lower than a maximum flow rate of the swing motor at a state where the relief pressure of the relief valve for the swing motor to be adjusted is lower than the relief pressure of the relief valve for other swing motors.

2. The method for adjusting relief pressure of a relief valve for a swing motor according to claim 1, wherein:

the swing motor is set in pairs, with the rotation of each swing motor forcibly stopped, setting the relief pressure of the relief valve for one swing motor to higher pressure than the relief pressure of the relief valve for the other swing motor, to adjust the relief pressure of the relief valve for the other swing motor while supplying the working fluid from the pump at a flow rate less than or equal to the maximum flow rate of the swing motor;

setting the relief pressure of the relief valve for one swing motor to lower pressure than the relief pressure of the relief valve for the other swing motor adjusted in the first step, to adjust the relief pressure of the relief valve for one swing motor while supplying the working fluid from the pump with a flow rate less than or equal to the maximum flow rate of the swing motor.

3. The method for adjusting relief pressure of a relief valve for a swing motor according to claim 1, wherein:

one swing motor has a shorter supply line for working fluid from the pump than the other swing motors.

4. The method for adjusting relief pressure of a relief valve for a swing motor according to claim 1, wherein:

the flow rate of the working fluid supplied when adjusting the relief pressure is the maximum flow rate of the swing motor.

5. The method for adjusting relief pressure of a relief valve for a swing motor according to claim 2, wherein:

the flow rate of the working fluid supplied when adjusting the relief pressure is the maximum flow rate of the swing motor.

6. The method for adjusting relief pressure of a relief valve for a swing motor according to claim 3, wherein:

the flow rate of the working fluid supplied when adjusting the relief pressure is the maximum flow rate of the swing motor.

* * * * *